No. 722,228. PATENTED MAR. 10, 1903.
G. GRIMM.
BOWL HOLDER.
APPLICATION FILED JULY 3, 1902.
NO MODEL.
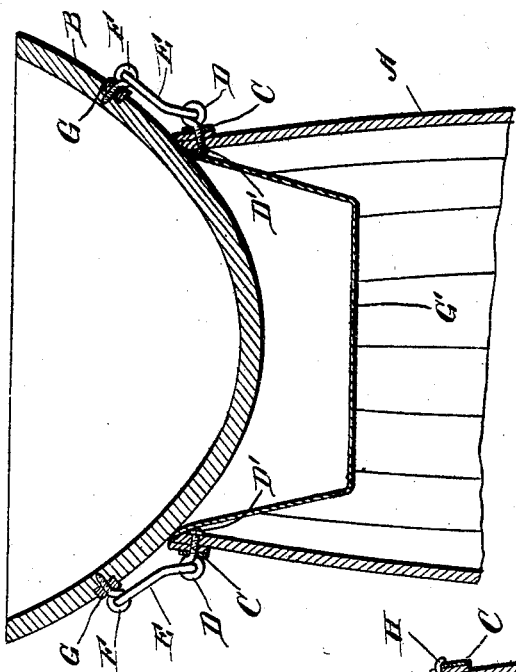
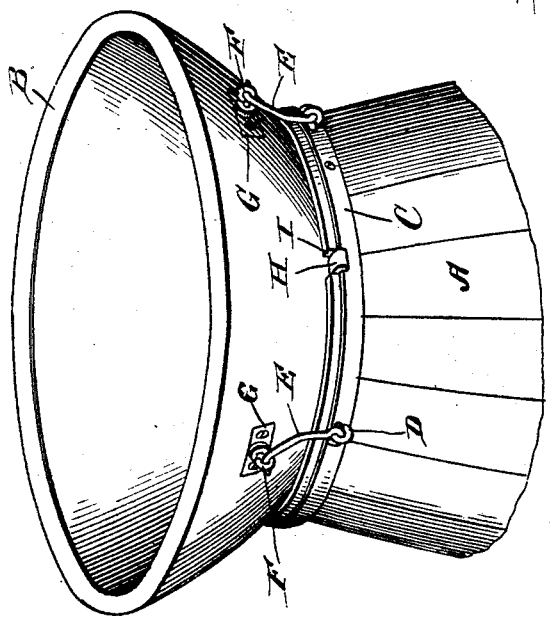
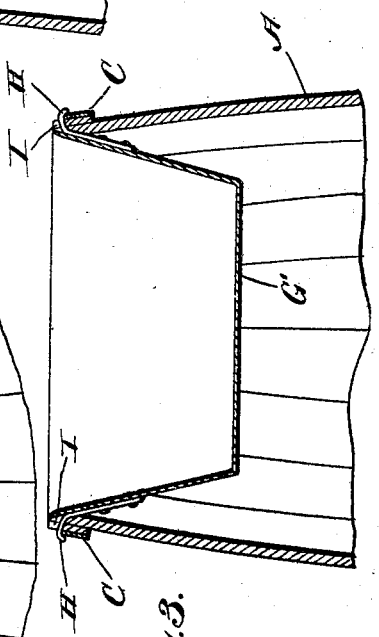
Witnesses
Louis D. Heinrichs
L. H. Morrison
Inventor
George Grimm
By his Attorney
W. Preston Williamson
THE NORRIS PETERS CO., PHOTO-LITHO., WASHINGTON, D. C.

UNITED STATES PATENT OFFICE.

GEORGE GRIMM, OF BALTIMORE, MARYLAND.

BOWL-HOLDER.

SPECIFICATION forming part of Letters Patent No. 722,228, dated March 10, 1903.

Application filed July 3, 1902. Serial No. 114,195. (No model.)

*To all whom it may concern:*

Be it known that I, GEORGE GRIMM, a citizen of the United States, residing at Baltimore, State of Maryland, have invented a certain new and useful Improvement in Bowl-Holders, of which the following is a specification.

My invention relates to a new and useful improvement in bowl-holders, and has for its object to provide an apparatus for holding a baker's bowl upon the top of an ordinary flour-barrel and also providing a receptacle adapted to be suspended upon the interior of the bowl, in which the bottom of the bowl extends, and this receptacle is adapted to contain either ice or hot water, according to the nature of the contents being mixed in the bowl or according to the temperature.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a perspective view of a bowl held in my improved bowl-holder; Fig. 2, a vertical sectional view of a bowl and a portion of the barrel, showing my bowl-holder applied; Fig. 3, a vertical sectional view of the upper portion of the barrel, showing the receptacle for containing ice or hot water suspended therein.

In bake-shops it is almost a universal practice to utilize a barrel for holding the mixing-bowl. The bowl is set in the barrel and is thereby held while the mixing is being done; but the great disadvantage of this is that the bowl will move while the dough is being kneaded or mixed, because of the rotundity of the bowl. My invention is for the purpose of holding the bowl steady, but allowing for the same to be easily detached from the barrel, so as to be removed.

In the drawings, A represents an ordinary flour-barrel, and B the mixing-bowl.

C is a metallic ring of sufficient size to fit over the top wooden hoop of the barrel, and through this metallic ring is formed four or more holes, and this ring is held to the barrel by means of the screw-eyes D, passed through four holes, each being arranged upon the quarter, or, in other words, there are four screw-eyes arranged at equal distances from one another. These screw-eyes are secured through the wooden hoop and through the staves of the barrel and are secured upon the inner end by nuts D'. If it is found that these screw-eyes are not sufficient to hold the ring D securely in place, ordinary screws may be inserted through holes provided in the ring. To each of the screw-eyes D are secured hooks E, which are bent to conform with the contour of the bowl, and to the side of the bowl are secured four screw-eyes F, which are arranged upon the quarter, so as to be equally distant from one another. These screw-eyes are threaded through a plate G and into the bowl, but not to pass entirely through the same. The plates G are secured to the bowl by screws or otherwise. These screw-eyes F are so arranged that when the bowl B is set into the open upper end of the barrel and the screw-eyes F arranged over the screw-eyes D the hooks may then be hooked into the screw-eyes F, so as to hold the bowl steady upon the barrel; but when it is desired to disengage the bowl the hooks E may be thrown out of the screw-eyes F very quickly, and the bowl can then be lifted off from the barrel.

In mixing some kinds of dough it is very essential that said dough shall be kept at a low temperature, and then, again, in mixing other kinds of dough it is essential that the same shall be slightly heated. Therefore for the purpose of conveniently accomplishing this I provide a receptacle G', which is in the form of a tub, but can be made of tin or any other material, and which should be shallow in depth, so as to bring the ice immediately under the bottom of the bowl, and which may be inserted in the barrel before the bowl is placed on top. Secured to opposite sides of this receptacle G' are upwardly-extending hook-shaped arms H, which are adapted to hook over the edge of the barrel and lie within notches I and downward from the top of the barrel. Thus the hook-shaped arms H will in reality hang from the metallic ring C. The object of providing the notches I is to cause the hook-shaped arms H to lie below the level of the edge of the barrel, so as not to allow the bowl to come in contact therewith, which would cause the same to set unevenly. The receptacle G' is of such a size as to be easily inserted in the barrel and after being inserted in the barrel is filled with cracked ice or with heated water, as occasion requires.

Of course it is understood that the barrel may be held stationary by being fastened to the floor, or it may be weighted with stones or any other heavy substance.

Of course I do not wish to be limited to the exact construction here shown, as slight modifications could be made without departing from the spirit of my invention.

Having thus fully described my invention, what I claim as new and useful is—

In a device of the character described, a bowl, a series of plates having a central threaded aperture secured at a predetermined distance apart upon the outer surface of the bowl, screw-eyes threaded in the central apertures of the plates and into the body of the bowl, a metallic ring adapted to seat over the end of a barrel and provided with apertures, screw-eyes secured in the apertures of the metallic ring and having hooks secured to the screw-eyes, and adapted to engage the screw-eyes secured to the plates and bowl, a metallic receptacle having ears secured to its body portion adapted to engage the metallic ring as and for the purpose described.

In testimony whereof I have hereunto affixed my signature in the presence of two subscribing witnesses.

GEORGE GRIMM.

Witnesses:
CHARLES F. FISKE,
WALTER WARD CORRELL.